United States Patent
Yang et al.

(10) Patent No.: US 11,071,123 B2
(45) Date of Patent: Jul. 20, 2021

(54) TRANSPORT BLOCK BOUNDARY FLEXIBILITY

(71) Applicant: QUALCOMM Incorporated, San Diego, CA (US)

(72) Inventors: Yue Yang, San Diego, CA (US); Aziz Gholmieh, Del Mar, CA (US); Yu-Ting Yu, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/933,003

(22) Filed: Mar. 22, 2018

(65) Prior Publication Data

US 2018/0279328 A1    Sep. 27, 2018

Related U.S. Application Data

(60) Provisional application No. 62/476,572, filed on Mar. 24, 2017.

(51) Int. Cl.
*H04L 12/863*  (2013.01)
*H04W 72/12*  (2009.01)
(Continued)

(52) U.S. Cl.
CPC .............. *H04W 72/12* (2013.01); *H04L 1/189* (2013.01); *H04L 5/0007* (2013.01); *H04L 47/34* (2013.01);
(Continued)

(58) Field of Classification Search
CPC ...... H04W 4/08; H04L 5/0035; H04L 5/0078; G06F 11/0784
See application file for complete search history.

(56) References Cited

U.S. PATENT DOCUMENTS 5,793,983 A * 8/1998 Albert ................... H04L 1/0007
340/2.23
8,498,253 B2 * 7/2013 Krause .................. H04W 16/10
370/208
(Continued)

OTHER PUBLICATIONS

ETSI TS 136 321 V8.6.0: "LTE; Evolved Universal Terrestrial Radio Access (E-UTRA); Medium Access Control (MAC) Protocol Specification", Internet Citation, Jul. 2009, XP002781005, Retrieved from the Internet: URL:http://www.etsi.org/deliver/etsi_ts/136300_136399/136321/08.06.00_60/ts_136321v080600p.pdf, 49 pages.
(Continued)

*Primary Examiner* — Mansour Oveissi
(74) *Attorney, Agent, or Firm* — Norton Rose Fulbright LLP

(57) ABSTRACT

Methods and apparatus for providing transport block boundary flexibility are disclosed. In some aspects, a transmitter determines a plurality of blocks within a single transmission time interval (TTI), and transmits the plurality of blocks within the single TTI. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block. In additional aspects, a receiver receives these plurality of blocks within a single transmission time interval (TTI), and decodes a plurality of protocol data units in the plurality of blocks.

30 Claims, 8 Drawing Sheets

(51) Int. Cl.
*H04W 72/04* (2009.01)
*H04L 12/801* (2013.01)
*H04L 1/18* (2006.01)
*H04L 5/00* (2006.01)
*H04W 72/14* (2009.01)

(52) U.S. Cl.
CPC ......... *H04L 47/50* (2013.01); *H04W 72/0446* (2013.01); *H04L 5/001* (2013.01); *H04L 5/0035* (2013.01); *H04L 5/0048* (2013.01); *H04L 5/0053* (2013.01); *H04W 72/14* (2013.01)

(56) References Cited

U.S. PATENT DOCUMENTS

| | | | | |
|---|---|---|---|---|
| 2008/0232504 A1* | 9/2008 | Ma | ...................... | H04L 27/2626 375/267 |
| 2010/0239035 A1* | 9/2010 | Blankenship | ......... | H04L 1/0656 375/260 |
| 2010/0272006 A1 | 10/2010 | Bertrand et al. | | |
| 2011/0243106 A1* | 10/2011 | Hsu | ....................... | H04L 5/0096 370/336 |
| 2012/0079337 A1* | 3/2012 | Terry | ................... | H04L 1/0003 714/748 |
| 2013/0046968 A1 | 2/2013 | Dinan | | |
| 2015/0043433 A1* | 2/2015 | Ren | ....................... | H04L 1/1854 370/329 |
| 2015/0237644 A1* | 8/2015 | Golitschek Edler von Elbwart | .............. | H04B 7/2656 370/329 |
| 2016/0345347 A1* | 11/2016 | Cheng | .................... | H04L 5/001 |
| 2017/0215186 A1* | 7/2017 | Chen | ................. | H04W 72/0446 |

OTHER PUBLICATIONS

International Search Report and Written Opinion—PCT/US2018/023954—ISA/EPO—dated Jul. 2, 2018.

\* cited by examiner

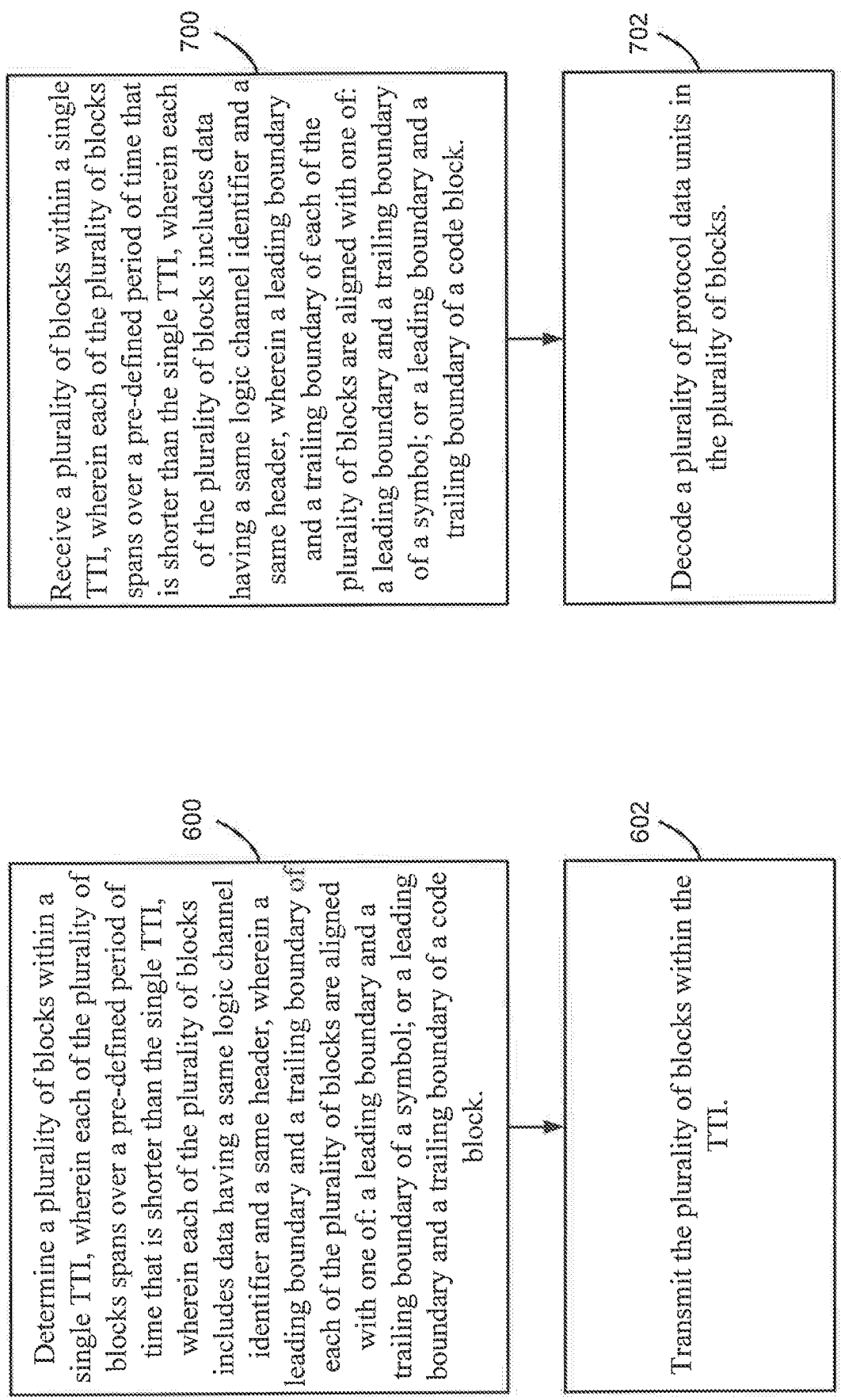

TRANSPORT BLOCK BOUNDARY FLEXIBILITY

CROSS-REFERENCE TO RELATED APPLICATIONS

This application claims the benefit of U.S. Provisional Patent Application No. 62/476,572, entitled, "TRANSPORT BLOCK BOUNDARY FLEXIBILITY," filed on Mar. 24, 2017, which is expressly incorporated by reference herein in its entirety.

BACKGROUND

Field

Aspects of the present disclosure relate generally to wireless communication systems, and more particularly, to methods and apparatus for providing transport block boundary flexibility.

Background

Wireless communication networks are widely deployed to provide various communication services such as voice, video, packet data, messaging, broadcast, and the like. A wireless communication network may include a number of access points can support communication for a number of user equipments (UEs). A UE may communicate with an access point via data exchanges on downlinks and uplinks. The downlink (or forward link) refers to the communication link from the access point to the UE, and the uplink (or reverse link) refers to the communication link from the UE to the access point. A communication link may be used to transmit data and control information on the downlink to a UE and/or may receive data and control information on the uplink from the UE.

Data payloads ever increase to support user demand, while inversely, high data rate requirements continually increase to meet service mandates. Concurrently striving to satisfy these inversely competing expectations within the confines of constrained spectrum real estate and power consumption limitations creates a necessity to grow increasingly creative in the sizing, timing, and coordination of data exchanges between devices.

SUMMARY

In one aspect of the disclosure, a method for wireless communication is disclosed. The method includes determining, by a transmitter, a plurality of blocks within a single transmission time interval (TTI), and transmitting, by the transmitter, the plurality of blocks within the single TTI. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, a method for wireless communication is disclosed. The method includes receiving, by a receiver, a plurality of blocks within a single TTI, and decoding, by the receiver, a plurality of protocol data units in the plurality of blocks. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, an apparatus for wireless communication is disclosed. The apparatus includes means for determining, by a transmitter, a plurality of blocks within a single TTI, and means for transmitting, by the transmitter, the plurality of blocks within the single TTI. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, an apparatus for wireless communication is disclosed. The apparatus includes means for receiving, by a receiver, a plurality of blocks within a single TTI, and means for decoding, by the receiver, a plurality of protocol data units in the plurality of blocks. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, a non-transitory computer-readable medium having program code recorded thereon. The program code further includes program code executable by a computer for causing the computer to determine, by a transmitter, a plurality of blocks within a single TTI, and program code executable by the computer for causing the computer to transmit, by the transmitter, the plurality of blocks within the single TTI. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, a non-transitory computer-readable medium having program code recorded thereon. The program code further includes program code executable by a computer for causing the computer to receive, by a receiver, a plurality of blocks within a single TTI, and program code executable by the computer for causing the computer to decode, by the receiver, a plurality of protocol data units in the plurality of blocks. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, an apparatus configured for wireless communication is disclosed. The apparatus includes at least one processor, and a memory coupled to the processor. The processor is configured to determine, by a transmitter, a plurality of blocks within a single TTI, and to transmit, by the transmitter, the plurality of blocks within the single TTI. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

In an additional aspect of the disclosure, an apparatus configured for wireless communication is disclosed. The apparatus includes at least one processor, and a memory coupled to the processor. The processor is configured to receive, by a receiver, a plurality of blocks within a single TTI, and to decode, by the receiver, a plurality of protocol data units in the plurality of blocks. Each of the plurality of blocks spans over a pre-defined period of time that is shorter than the single TTI. Each of the plurality of blocks includes data having a same logic channel identifier and a same header. A leading boundary and a trailing boundary of each of the plurality of blocks are aligned with one of: a leading boundary and a trailing boundary of a symbol; or a leading boundary and a trailing boundary of a code block.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a functional block diagram illustrating exemplary blocks executed by a transmitter to implement one aspect of the present disclosure.

FIG. 7 is a functional block diagram illustrating exemplary blocks executed by a receiver to implement one aspect of the present disclosure.

DETAILED DESCRIPTION

Figure 1:
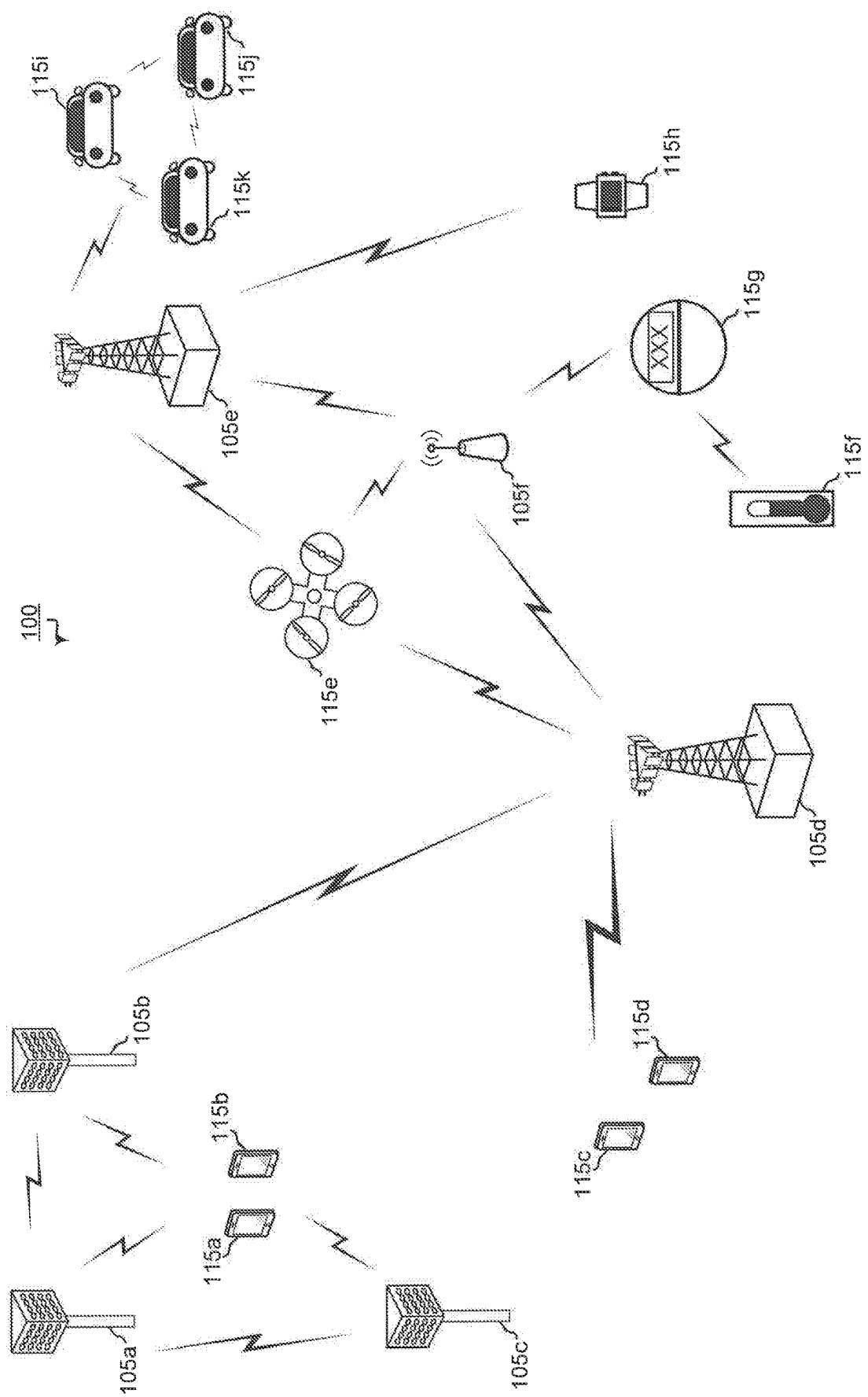
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/$kmin^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave)

transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
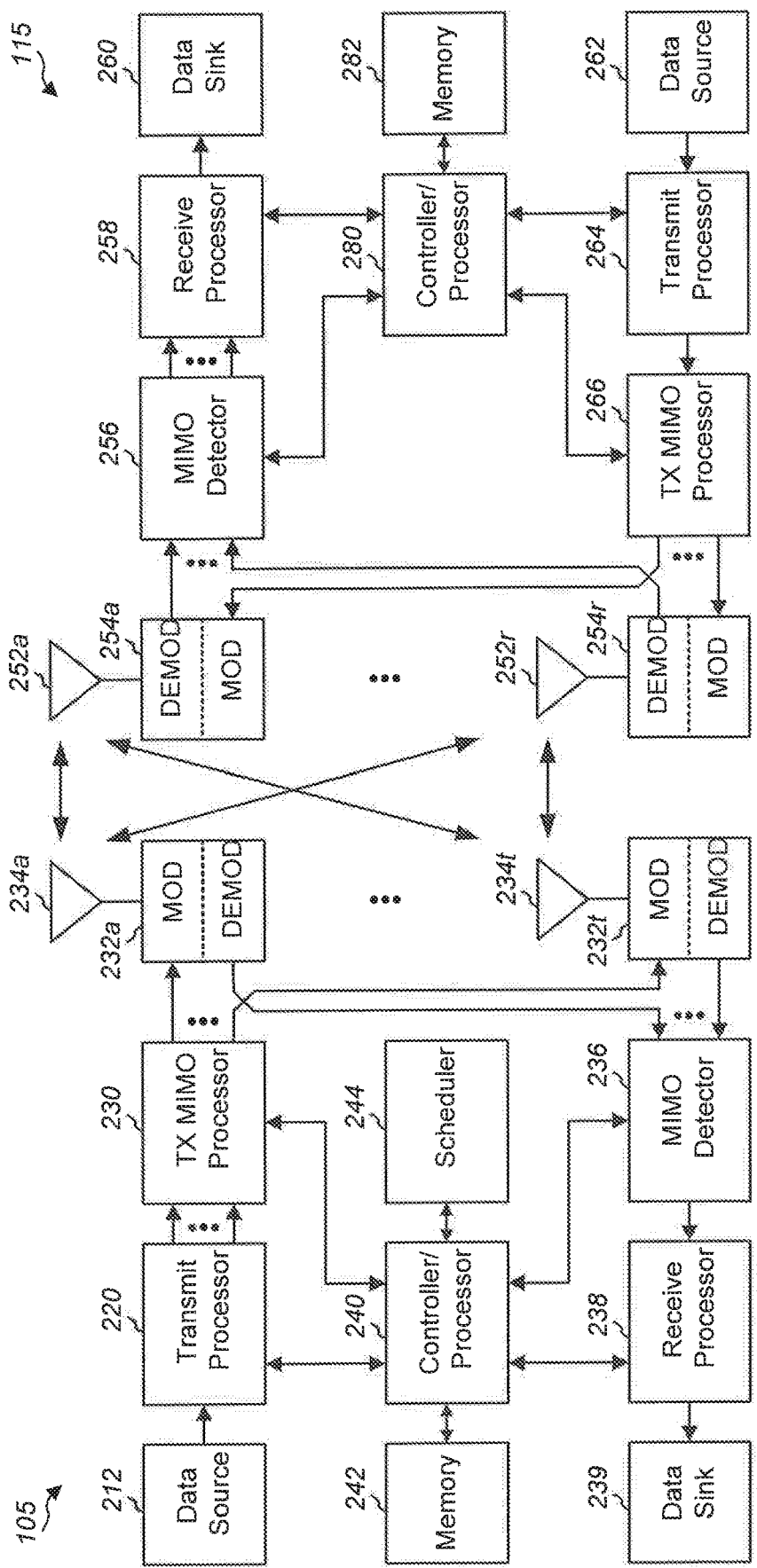
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be preceded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6-7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Of growing importance to network communications is high data rates, which may be accomplished by increasing transmission bandwidths. Transmission bandwidths may be increased by carrier aggregation (CA), sometimes referred to as channel aggregation, which utilizes more than one carrier that may be contiguous and/or in different bands. By using CA, more spectrum becomes available for use in sending communications. That being said, to utilize as much spectrum as possible, effectively handling non-contiguous CA becomes increasingly important. Embodiments herein provide, among other things, increasingly flexible boundaries for transport blocks (TB), which alleviates some of the technical challenges of CA.

A TB is a unit of data, intended for transmission, that is generated in the media access control (MAC) layer of a processor. TBs may vary in size (e.g., data length), as do the capabilities of various MAC layer encoders (e.g., convolution turbo code encoder), which encode the data of the TB prior to sending the TB data to the PHY layer of the processor. If the data length of a TB is greater than the maximum block size that is supported by the processor's encoder(s), then the TB may be segmented into blocks of data that are of a size that the encoder supports. These segmented blocks are called code blocks. During segmentation of a TB, code blocks are generated, which include data of the TB. Sometimes, code blocks of a particular size are desired and filler bits are included in one or more code block to in order to generate code blocks of a desired size. Sometimes a given TB is equal to or smaller than the length of data the processor's encoder(s) supports. In such a case, a single code block may be generated from the TB, and when the TB is smaller than a desired code block size, the code block may be generated comprising the TB data and filler bits to create a code block of the desired size.

After the one or more code blocks are generated from a TB, additional MAC layer processes are performed, including, but not limited to, code block encoding (e.g., turbo encoding), interleaving, and code block concentrating. When ready, code blocks, generated from one or more TB, are sent to the PHY layer for PHY layer processing. PHY layer processing includes, among other things, resource mapping, which generates one or more slots from code blocks (and thus from one or more TB), wherein a slot comprise symbols that are generated for transmission. In embodiments, a slot is generated with fourteen (14) symbols.

Of further consideration are time transmission intervals (TTI)s. A TTI is an amount of time the PHY layer takes to transmit one version of the symbols generated from a TB. In an example, when the PHY layer receives TB data, the PHY layer prepares for the possibility of fading or other throughput difficulties by generating multiple versions (e.g., redundancy versions) of the symbols generated from the TB. In embodiments, the PHY layer transmits a first version in a slot and waits for a certain about of time to receive a HARQ ACK/NACK to determine whether to send a next version (e.g., the same version or an alternative version) of the symbols generated from the TB in another slot. The amount of time it takes the PHY layer to transmit one of the aforementioned redundancy versions of the symbols generated from the TB is a TTI. Said another way, a TTI is the periodicity with which the PHY layer transmits the data of a TB.

Figure 3A:
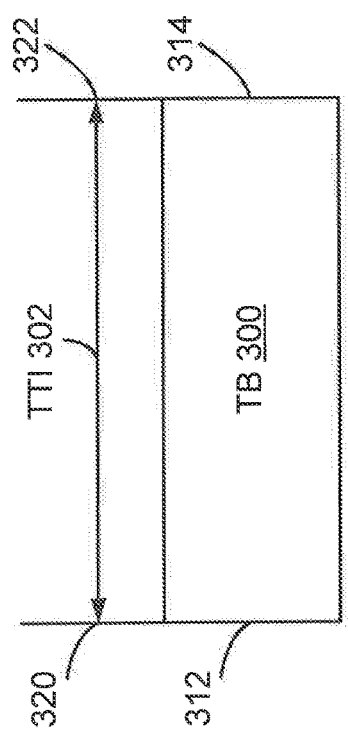
FIG. 3A is a timing diagram for TB transmissions.

In FIG. 3A, one TB 300 is transmitted within one TTI 302. TTI represents an unit of time and lasts for a defined period of time, e.g., the amount of time it takes for transmission of one version of TB 300. In embodiments, a TTI may last for 1 ms; in embodiments, TTI may last a lesser amount of time. TB represents a unit of data size for one transmission. In this example, leading boundary 312 and trailing boundary 314 of TB 300 are aligned with beginning boundary 320 and ending boundary 322 of TTI 302. As such, TB 300 spans over a period of time that is equal to TTI 302.

Figure 3B:
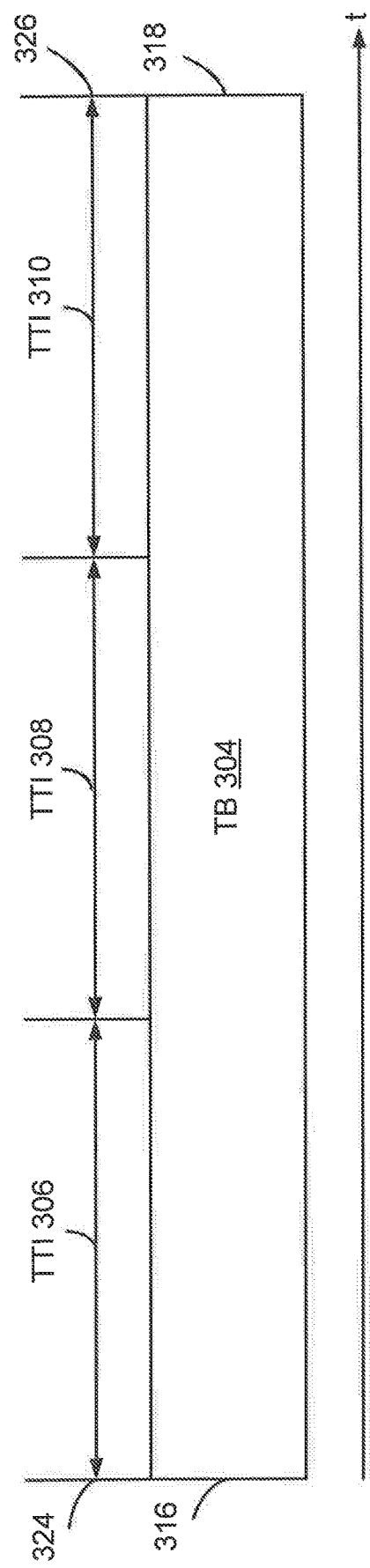
FIG. 3B is a timing diagram for TB transmissions.

In embodiments, path loss and errors may be reduced by transmitting multiple versions of the symbols generated from a TB in consecutive slots without waiting for reception of a HARQ ACK/NACK. Transmitting redundancy versions of a TB in consecutive slots may be called TTI bundling. In examples, the boundaries of each version of a TB may line up with the boundaries of each consecutive TTI, such that the leading edge of the first symbol of the first version of the TB aligns with the leading edge of the first TTI of the TTI bundle, and the trailing edge of the last symbol of the last version of the TB aligns with the trailing end the last TTI of the TTI bundle. FIG. 3B illustrates an example of such an embodiment wherein the data of TB 304, is transmitted three times within three TTIs (e.g., TTIs 306, 308, and 310). Leading boundary 316 and trailing boundary 318 of TB 304 are aligned with leading boundary 324 of TTI 306 and trailing boundary 326 of TTI 310. TB 304 spans over a period of time that is longer than any of TTIs 306, 308, or 310.

FIGS. 3A and 3B illustrate examples wherein the boundaries of a TB lines up with the leading and falling edge of a TTI or TTI bundle. Providing for TB boundaries that do not necessarily line up with the leading and trailing edges of a TTI or TTI bundle may be advantageous. These advantageous may become more pronounced as data size grows and data transmissions/processing increase (e.g., LTE as compared to 5G).

For instance, the size of a TB that spans over multiple TTIs (e.g., 4 redundancy versions of a TB spanning 4 TTIs) is usually large sometimes having a data size up to thirty-six (36) kB. Further, if a TB span is long, a sequence of packet data convergence protocol (PDCP) protocol data units (PDUs) in the TB may also be long as all the PDUs may be required to be in sequence. When all the PDUs in the TB are required to be in sequence, a transmitter may not be able to transmit any other data, including prioritized data, before all the PDUs in sequence in the TB have been transmitted. Adding to this problem, a transmitter may need to buffer all the PDUs in sequence in the TB in a hybrid automatic repeat request (HARQ) buffer for possible retransmissions. This may not only decrease implementation flexibility, but also increase the burdens of a buffer.

Also, in certain scenarios, PDUs in the TB may be required to be transmitted and delivered in sequence. Therefore, a receiver may not be able to reorder the PDUs until all the PDUs are delivered in sequence. This may cause yet longer delays on data processing. Moreover, all the symbols generated from the TB may have the same modulation and coding scheme. Accordingly, robustness of different symbols from the same TB may not be able to be adjusted. In light of the foregoing, forcing and/or requiring the leading boundary and trailing boundary of a TB to align with the beginning boundary and ending boundary of a TTI or TTI bundle may not maximize network efficiency but rather cause buffer burdens and data processing delays.

Providing alignment flexibility of the leading and trailing boundaries of a TB with respect to a TTI and/or TTI bundle improves transmission and reception efficiency. Further, additional and/or other improvements may be realized by flexibly reducing the size of a TB such that the data of multiple TBs may be transmitted within a single TTI. TB alignment flexibility and size flexibility reduces the buffer burdens and improves data processing delays. Additional aspects of the present disclosure provide flexibility on arranging PDUs in multiple TBs within a TTI. As a result, a portion of the PDUs to be transmitted may be transmitted upon being pre-buffered. In other words, a transmitter may start transmitting a portion of the PDUs to be transmitted before all the PDUs in all the TBs within a TTI are pre-buffered. Correspondingly, a receiver may start processing the received portion of PDUs before all the PDUs in all the TBs within a TTI are received.

Figure 4:
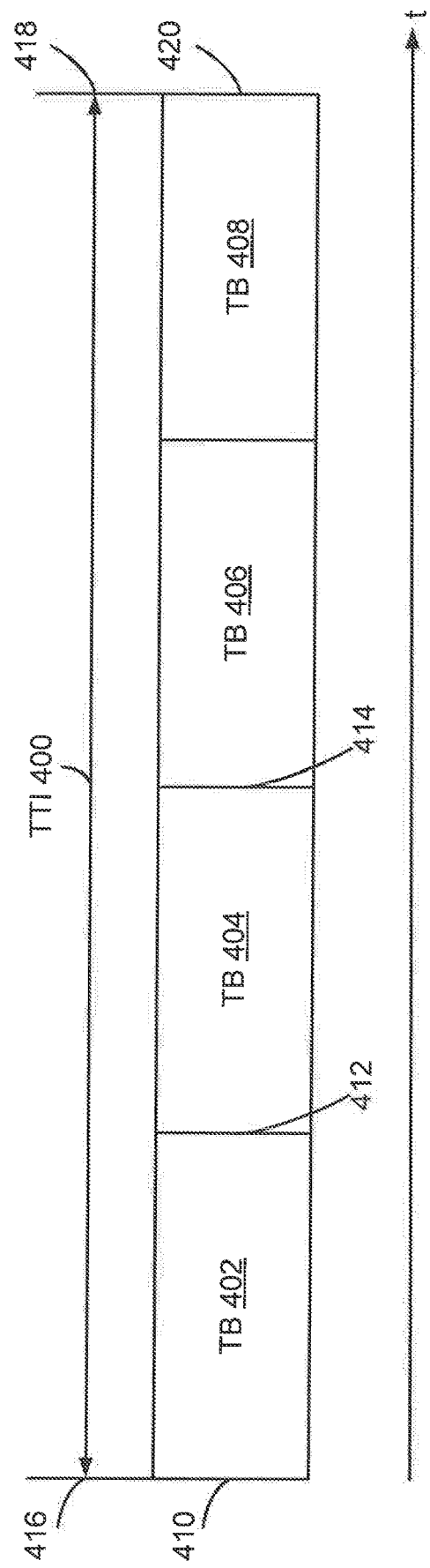
FIG. 4 is a block diagram illustrating multiple TBs within a TTI according to one aspect of the present disclosure.

FIG. 4 is a block diagram illustrating multiple TBs within a TTI according to one aspect of the present disclosure. TBs 402, 404, 406, and 408 may be transmitted in time sequence. Each TB may have a leading boundary and a trailing boundary in time sequence. For any two adjoining TBs, the trailing boundary of the first TB may be the leading boundary of the second TB. For example, TB 402 may have leading boundary 410 and trailing boundary 412, and TB 404 may have leading boundary 412 and trailing boundary 414. Each of TBs 402, 404, 406, and 408 may span over a pre-defined period of time that is shorter than TTI 400. The pre-defined period of time may be determined based on implementation or network configuration. Therefore, at most, only one of the boundaries of each TB may be aligned with either the beginning boundary of TTI 400 or the ending boundary of TTI 400. For instance, leading boundary 410 of TB 402 may be aligned with beginning boundary 416 of TTI 400, and trailing boundary 420 of TB 408 may be aligned with ending boundary 418 of TTI 400. In other words, the leading and trailing boundaries of each of TBs 402, 404, 406, and 408 may not be aligned with both the beginning and ending boundaries of TTI 400 at the same time.

In FIG. 4, the leading and trailing boundaries of each TB, such as TBs 402, 404, 406, or 408, may be aligned with the leading and trailing boundaries of one or multiple symbols. A symbol is the smallest unit to convey/receive data. For example, in LTE, there may be fourteen (14) symbols in one TTI. TB 402 may be transmitted on one (1) symbol, TB 404 may be transmitted on seven (7) symbols, TB 406 may be transmitted on four (4) symbols, and TB 408 may be transmitted on two (2) symbols. In this case, the maximum number of TBs allowed to be transmitted within one TTI would be fourteen (14). Therefore, the leading and trailing boundaries of TB 402 may be aligned with the leading and trailing boundaries of the first symbol; the leading and trailing boundaries of TB 404 may be aligned with the leading boundary of the second symbol and the trailing boundary of the eighth symbol; the leading and trailing boundaries of TB 406 may be aligned with the leading boundary of the ninth symbol and the trailing boundary of the twelfth symbol; and the leading and trailing boundaries of TB 408 may be aligned with the leading boundary of the thirteen symbol and the trailing boundary of the fourteenth symbol.

In embodiments, the number of symbols in one TTI may vary. In one of many 5G examples, there may be twenty-eight (28) symbols in one TTI. Therefore, TB 402 may be transmitted on seven (7) symbols, TB 404 may be transmitted on eight (8) symbols, TB 406 may be transmitted on ten (10) symbols, and TB 408 may be transmitted on three (3) symbols. In this case, the maximum number of TBs allowed to be transmitted within one TTI would be twenty-eight (28). Therefore, the leading and trailing boundaries of TB 402 may be aligned with the leading boundary of the first symbol and the trailing boundaries of the seventh symbol; the leading and trailing boundaries of TB 404 may be aligned with the leading boundary of the eighth symbol and the trailing boundary of the fifteenth symbol; the leading and trailing boundaries of TB 406 may be aligned with the leading boundary of the sixteenth symbol and the trailing boundary of the twenty-fifth symbol; and the leading and trailing boundaries of TB 408 may be aligned with the leading boundary of the twenty-sixth symbol and the trailing boundary of the twenty-eight symbol. Alternatively, the leading and trailing boundaries of a TB, such as TBs 402, 404, 406, or 408, may be aligned with the leading and trailing boundaries of a code block.

A TB, such as TBs 402, 404, 406, or 408, may include data having the same logic channel identifier (LCID) or the same header. A TB, such as TBs 402, 404, 406, or 408, may also be a regular TB having both control information and data and spanning over a pre-defined period of time that is shorter than a single TTI. The control information may include hopping information, padding information, etc. In some aspects of the present disclosure, a TB may only include data. For instance, the TBs in the middle of a TTI, such as TBs 404 or 406, may only include data.

PDUs in the TBs in a single TTI, such as TBs 402, 404, 406, and 408, may be in sequence. For example, in LTE, PDUs 1-10 may be in TB 402, PDUs 11-20 may be in TB 404, PDUs 21-30 may be in TB 406, and PDUs 31-40 may be in TB 408. PDUs 1-40 may be transmitted and delivered in sequence. A transmitter may transmit PDUs 1-10 in TB 402, PDUs 11-20 in TB 404, PDUs 21-30 in TB 406, and then PDUs 31-40 in TB 408. A receiver may receive PDUs 1-10 in TB 402, PDUs 11-20 in TB 404, PDUs 21-30 in TB 406, and then PDUs 31-40 in TB 408. Alternatively, PDUs 1-40 in the TBs in a single TTI, such as TBs 402, 404, 406, and 408, may be not in sequence. For instance, PDUs 1-10 may be in TB 402, PDUs 30-40 may be in TB 404, PDUs 11-20 may be in TB 406, and PDUs 21-30 may be in TB 408. In some aspects of the present disclosure, the PDUs in each TB may be in sequence.

Figure 5:
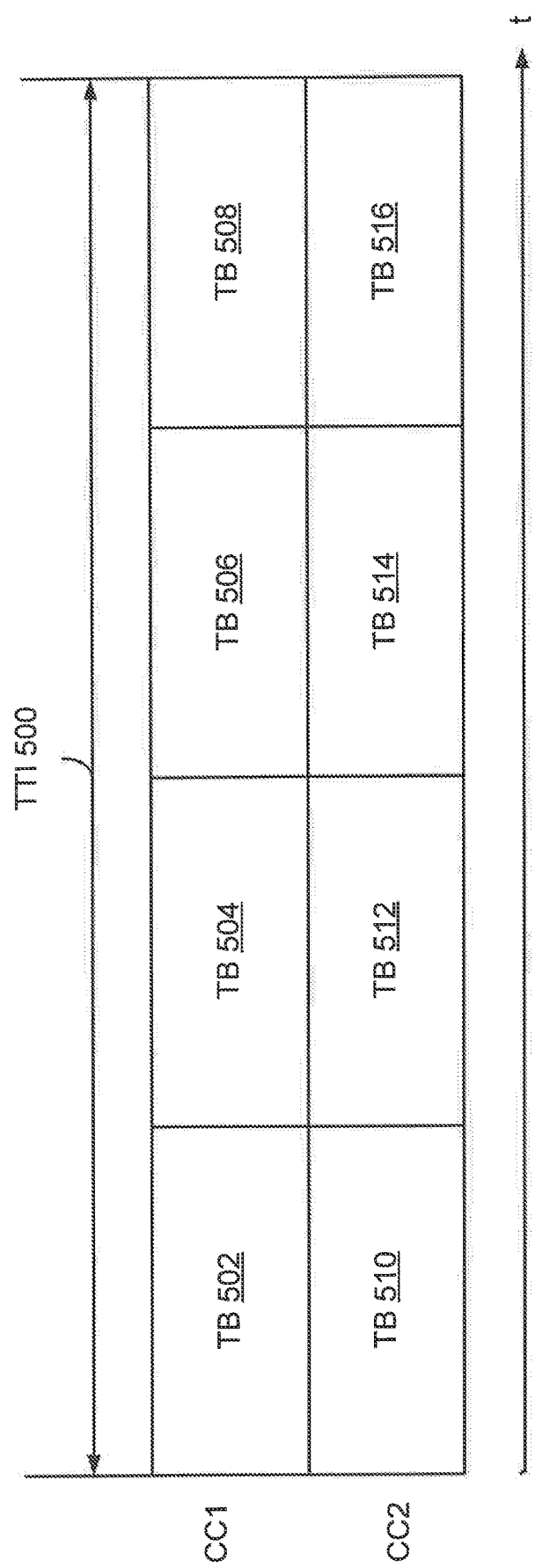
FIG. 5 is a block diagram illustrating multiple TBs within a TTI in carrier aggregation according to one aspect of the present disclosure.

FIG. 5 is a block diagram illustrating multiple TBs within a TTI in carrier aggregation according to one aspect of the present disclosure. TBs 502-516 may be transmitted in time sequence. A transmitter may transmit TBs 502 and 510 simultaneously, TBs 504 and 512 simultaneously, TBs 506 and 514 simultaneously, and then TBs 508 and 516 simultaneously.

PDUs in the TBs in a TTI in carrier aggregation may be in sequence, which means that the PDUs may be assigned to the TBs on the first component carrier (CC1), and then to the TBs on the second component carrier (CC2). For example, in LTE, PDUs 1-10 may be in TB 502, PDUs 11-20 may be in TB 504, PDUs 21-30 may be in TB 506, and PDUs 31-40 may be in TB 508 on CC1. PDUs 41-50 may be in TB 510, PDUs 51-60 may be in TB 512, PDUs 61-70 may be in TB 514, and PDUs 71-80 may be in TB 516 on CC2. Alternatively, PDUs in TBs in a TTI in carrier aggregation may not be in sequence. For example, PDUs 1-10 may be in TB 502 on CC1, but PDUs 11-20 may be in TB 510 on CC2. In this case, PDUs 1-20 are in sequence only within TBs 502 and 510. Accordingly, PDUs 1-10 may be in TB 502, PDUs 41-50 may be in TB 504, PDUs 21-30 may be in TB 506, and PDUs 31-40 may be in TB 508 on CC1. PDUs 11-20 may be in TB 510, PDUs 51-60 may be in TB 512, PDUs 61-70 may be in TB 514, and PDUs 71-80 may be in TB 616 on CC2.

The networks that have higher requirements on data transmitting and processing, such as 5G networks, may pre-buffer data to be transmitted in a transmitter chip from a memory, such as a double data rate (DDR) memory, in order to meet a tighter transmission schedule. Therefore, preferably, PDUs may not be arranged in sequence because a transmitter may only pre-buffer a portion of all the PDUs in TBs that have higher transmission priority, such as PDUs 1-10 in TB 502 and PDUs 11-20 in TB 510, when PDUs 1-80 are not in sequence. Then, a transmitter can transmit PDUs 1-20 upon PDUs 1-20 being pre-buffered. Since PDUs 1-20 in TBs 502 and 510 are in sequence, PDUs 1-20 in TBs 502 and 510 can be pre-buffered and transmitted without pre-buffering all the PDUs 1-80. Correspondingly, a receiver can start decoding, reordering, processing, and delivering to an upper layer data in PDUs 1-20 upon receipt of PDUs 1-20 in TBs 502 and 510. Both the transmitter and receiver can start processing a portion of the PDUs without pre-buffering and receiving all the PDUs. Accordingly, the speed of data processing on both the transmitter and receiver sides is improved.

Alternatively, PDUs may be arranged in sequence in certain scenarios, such as in LTE. In this case, before a transmitter obtains grant information, all the PDUs in TBs 502-516 may be pre-buffered, and then be transmitted once the grant information available. This is because the grant information may be used to make sure that PDUs to be transmitted is in sequence as it indicates the size of PDUs, the ending of the sequence of PDUs, the location of each PDU, and other control information. Without the grant information, a transmitter cannot be sure which PDUs to transmit in TBs that have higher transmission priority, such as TBs 502 and 510. For example, grant information may indicate that PDUs 1-10 are in TB 502, PDUs 11-20 are in TB 504, PDUs 21-30 are in TB 506, PDUs 31-40 are in TB 508, PDUs 41-50 are in TB 510, PDUs 51-60 are in TB 512, PDUs 61-70 are in TB 514, and PDUs 71-80 are in TB 516. Without this grant information, a transmitter may not know which PDUs to transmit in TBs 502 and 510. Comparing to the case that PDUs are not in sequence, the arrangement of PDUs in sequence may increase buffer burdens.

In operation according to some embodiments herein, when one or more TBs, such as TBs 504 and 514, may be corrupted or not received correctly by a receiver, a transmitter may retransmit the failed TBs. The receiver may send the transmitter messages to indicate a receiving status for each TB, such as an acknowledgement (ACK) message, or a negative acknowledgement (NACK) message. Accordingly, a transmitter may not need to retransmit all the TBs, such as TBs 502-516, within a TTI.

In operation according to further embodiments herein, grant information or other control information may be also TB-specific. For example, TBs 508 and 512 may have different grants, different modulation and coding schemes, and carry different types of data. Therefore, a transmitter may have better flexibility on adjusting robustness of each TB. In some cases, in order to save grant bits, a transmitter may apply the same grant to all the TBs.

Figure 8A:
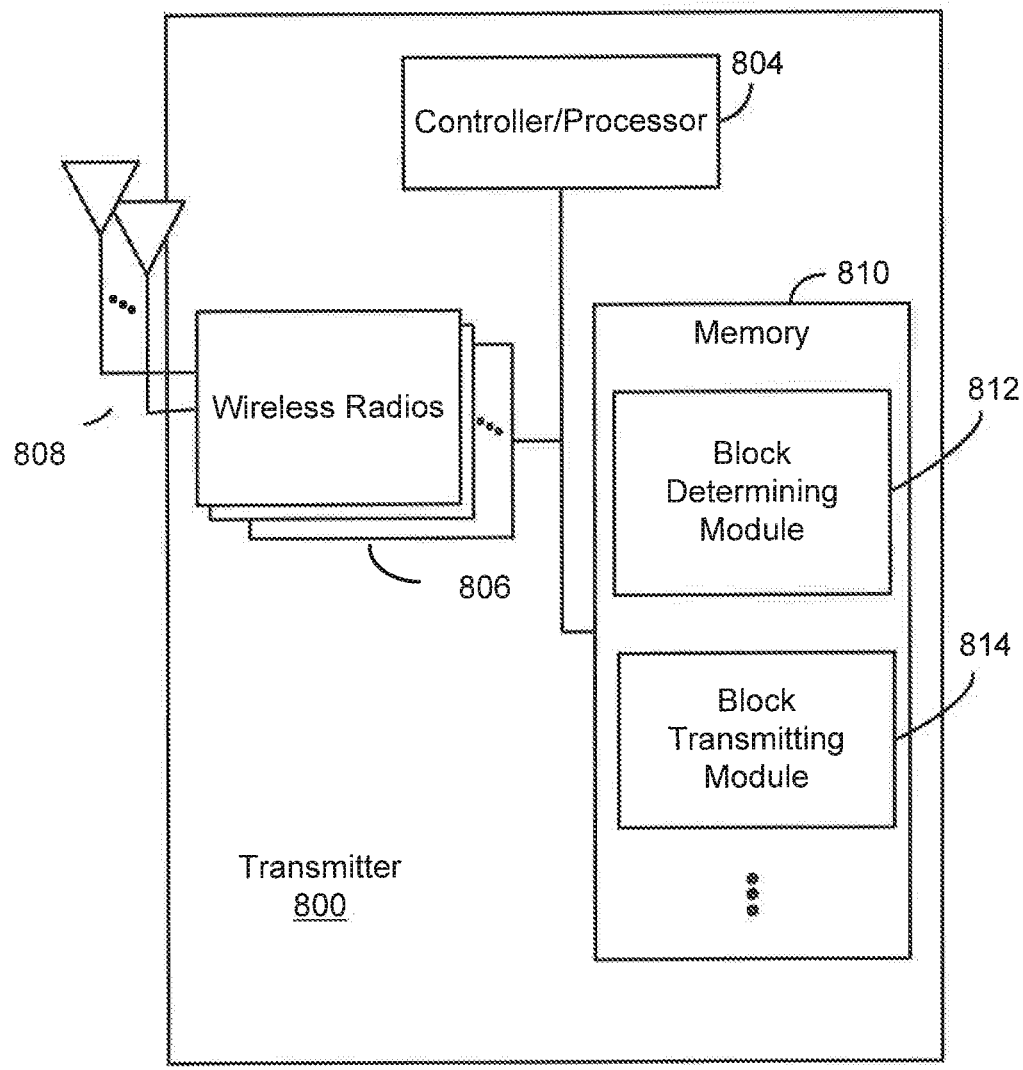
FIG. 8A is a block diagram of a transmitter in a communication network according to one aspect of the present disclosure.

FIG. 6 is a functional block diagram illustrating exemplary blocks executed by a transmitter to implement one aspect of the present disclosure. The example blocks may be implemented by transmitter 800, UE 115, or base station 105, as illustrated in FIG. 1, 2, or 8A. The example blocks in FIG. 6 may be executed by processor 240, 280, or 804, as illustrated in FIG. 1, 2, or 8A. At block 600, the transmitter may determine a plurality of blocks within a single transmission time interval (TTI). Each of the plurality of blocks may include data having a same logic channel identifier and a same header. A leading boundary and a trailing boundary of each of the plurality of blocks may be aligned with one of: a leading boundary and a trailing boundary of a symbol; or a leading boundary and a trailing boundary of a code block. Each of the plurality of blocks may span over a pre-defined period of time that is shorter than the single TTI. Therefore, the leading and trailing boundaries of each of the plurality of blocks may not be aligned with the beginning and ending boundaries of the single TTI. At block 602, the transmitter may transmit the plurality of blocks within the single TTI.

In some embodiments, the transmitter may transmit some of the plurality of blocks upon such blocks being pre-buffered. In additional embodiments, the transmitter may retransmit one or more blocks of the plurality of blocks that are corrupted or received incorrectly. The boundary of each block may be determined based on communication environment, transmission requirements, various information specific to each block, such as grant information, a modulation and coding scheme, a data type, an ACK/NACK message of each block, or any combination thereof. Flexible block boundary and block-specific information may facilitate implementation flexibility and data processing speed.

Figure 8B:
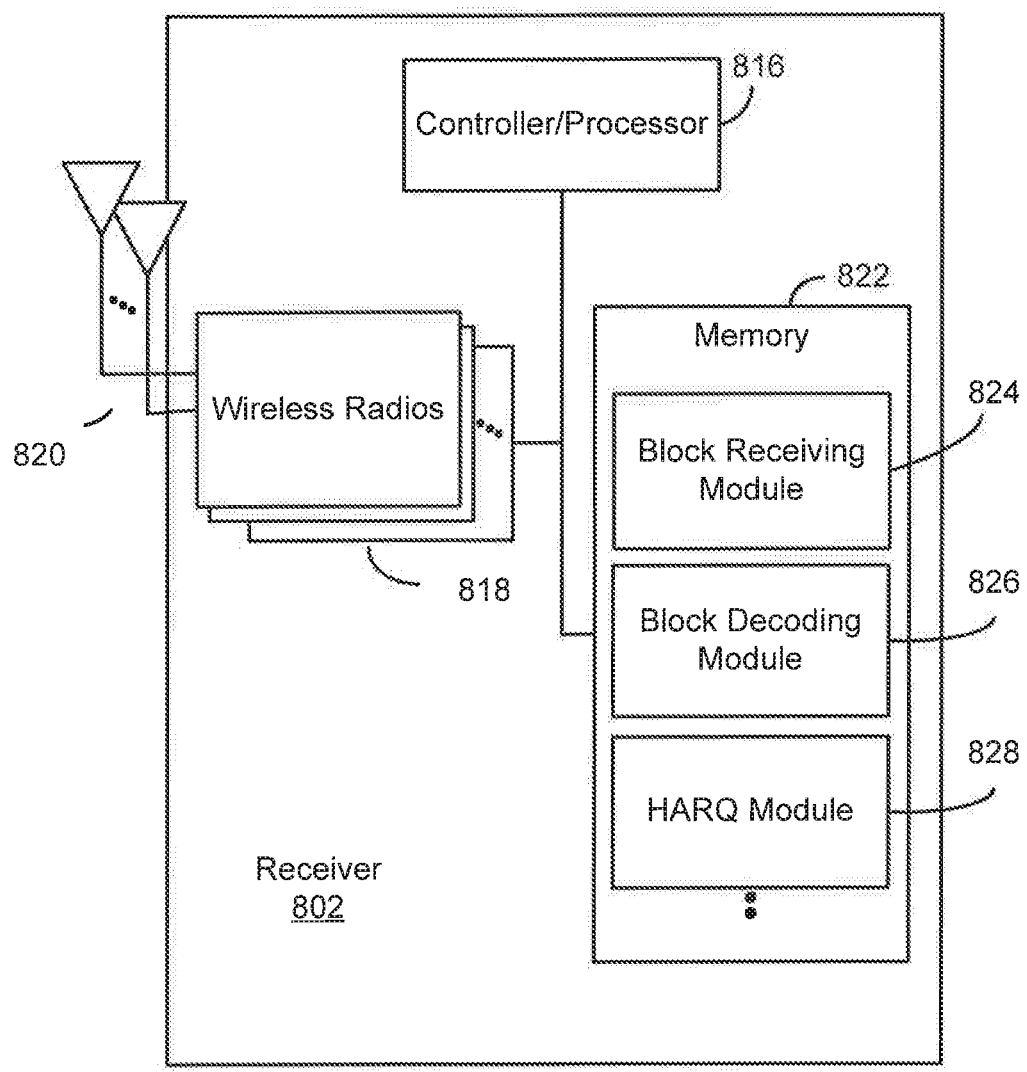
FIG. 8B is a block diagram of a receiver in a communication network according to one aspect of the present disclosure.

FIG. 7 is a functional block diagram illustrating exemplary blocks executed by a receiver to implement one aspect of the present disclosure. The example blocks may be implemented by receiver 802, UE 115, or base station 105, as illustrated in FIGS. 1, 2, and 8B. The example blocks in FIG. 7 may be executed by processor 240, 280, or 816, as illustrated in FIG. 1, 2, or 8B. At block 700, the receiver may receive a plurality of blocks within a single transmission time interval (TTI). Each of the plurality of blocks may include data having a same logic channel identifier and a same header. A leading boundary and a trailing boundary of each of the plurality of blocks may be aligned with one of: a leading boundary and a trailing boundary of a symbol; or a leading boundary and a trailing boundary of a code block. Each of the plurality of blocks may span over a pre-defined period of time that is shorter than the single TTI, Therefore, the leading and trailing boundaries of each of the plurality of blocks may not be aligned with the beginning and ending boundaries of the single TTI. At block 702, the receiver may decode a plurality of protocol data units in the plurality of blocks.

In some embodiments, the receiver may decode a portion of the plurality of protocol data units in two or more blocks of the plurality of blocks upon receiving the two or more blocks of the plurality of blocks. In additional embodiments, the receiver may execute a HARQ procedure. The receiver may transmit an ACK message to a transmitter to indicate a successful receipt of block for one or more blocks. The receiver may also transmit a NACK message to a transmitter to indicate failure on receipt of block for one or more blocks. In further embodiments, the receiver may process the decoded plurality of protocol data units, such as reordering the decoded plurality of protocol data units, or delivering the decoded and reordered plurality of protocol data units to an upper layer.

FIG. 8A is a block diagram of a transmitter in a communication network according to one aspect of the present disclosure. Transmitter 800 may have the same or similar configuration as the configuration of UE 115 or base station 105, as illustrated in FIGS. 1 and 2. Transmitter 800 may include controller/processor 804 to perform or direct the execution of various processes or program codes stored in memory 810. Transmitter 800 may further include wireless radios 906 to process uplink or downlink signals received from antennas 808. Memory 810 may store program codes for execution of block boundary determining module 812, block transmitting module 814, or other modules/applications. Memory 242 or 282, as illustrated in FIG. 2, may also store program codes for execution of block boundary determining module 812, block transmitting module 814, or other modules/applications by controller/processor 240 or 280, as illustrated in FIG. 2.

Block boundary determining module 812 may be used to determine a plurality of blocks within a single TTI. Block boundary determining module 812 may align the leading and trailing boundaries of each block with the leading and trailing boundaries of a symbol or the leading and trailing boundaries of a code block. Block transmitting module 814 may be used to transmit the plurality of blocks within a TTI. In some embodiments, block transmitting module 814 may be used to transmit a portion of the plurality of blocks upon such blocks being pre-buffered. In additional embodiments, block transmitting module 814 may be used to retransmit one or more blocks that are corrupted or received incorrectly by a receiver.

FIG. 8B is a block diagram of a receiver in a communication network according to one aspect of the present disclosure. Receiver 802 may have the same or similar configuration as the configuration of UE 115 or base station 105, as illustrated in FIGS. 1 and 2. Receiver 802 may include controller/processor 816 to perform or direct the execution of various processes or program codes stored in memory 822. Receiver 802 may further include wireless radios 818 to process uplink or downlink signals received from antennas 820. Memory 822 may store program codes for execution of block receiving module 824, block decoding module 826, HARQ module 828, or other modules/applications. Memory 242 or 282, as illustrated in FIG. 2, may also store program codes for execution of block receiving module 824, block decoding module 826, HARQ module 828, or other modules/applications by controller/processor 240 or 280, as illustrated in FIG. 2.

Block receiving module 824 may be used to receive a plurality of blocks. The leading and trailing boundaries of each of the plurality of blocks may be aligned with the leading and trailing boundaries of a symbol or the leading and trailing boundaries of a code block. Block decoding module 826 may be used to decode a plurality of protocol data units in the plurality of blocks. In some embodiments, block decoding module 826 may decode a portion of the plurality of protocol data units in two or more blocks of the plurality of blocks upon the two or more blocks of the plurality of blocks being received by block receiving module 824. HARQ module 828 may be used to determine whether one or more blocks of the plurality of blocks are received correctly. If yes, HARQ module 828 may transmit an ACK message to a transmitter. If not, HARQ module 828 may transmit a NACK message to a transmitter. The ACK/NACK message may be specific to each block or multiple blocks. Alternatively, the ACK/NACK message may be specific to each TTI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6-7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   determining, by a transmitter, a plurality of blocks corresponding to one or more transport blocks within a single transmission time interval (TTI), wherein each of the plurality of blocks spans over a pre-defined period of time that is shorter than the single TTI, wherein each of the plurality of blocks includes data corresponding to a same logical channel identifier and a same header, wherein each of the plurality of blocks is aligned with a corresponding set of one or more symbols; and
   transmitting, by the transmitter, the plurality of blocks within the single TTI.

2. The method of claim 1, further comprising:
   pre-buffering two or more blocks of the plurality of blocks; and
   transmitting the two or more blocks of the plurality of blocks upon the two or more blocks being pre-buffered; and
   wherein a plurality of protocol data unit in the two or more blocks are in sequence.

3. The method of claim 2, wherein:
   at least two blocks of the plurality of blocks are transmitted via a same component carrier during the single TTI;
   two or more blocks of the plurality of blocks are transmitted on different component carriers during the single TTI; and
   a plurality of protocol data units in the two or more blocks are:
   in sequence; or
   not in sequence.

4. The method of claim 1, further comprising:
   assigning a plurality of protocol data units to the plurality of blocks across multiple component carriers out of a transport block sequence by assigning a first set of protocol data units of the plurality of protocol data units to a first block of a first component carrier and a second set of protocol data unit of the plurality of protocol data units to a second block of a second component carrier, the second set of protocol data units being a next sequential set of protocol data units following the first set of protocol data units; and
   wherein the plurality of blocks within the single TTI are transmitted on the first and second component carriers, and
   wherein the first block of the first component carrier and the second block of the second component carrier are transmitted concurrently.

5. The method of claim 1, wherein each of the plurality of blocks includes:
   a transport block including control information and data; or
   a transport block only including the data.

6. The method of claim 1, further comprising:
retransmitting one or more blocks of the plurality of blocks that are corrupted; and
wherein, for each block of the plurality of blocks:
a leading boundary of the block is aligned with a leading boundary of the corresponding set of one or more symbols, or
a trailing boundary of the block is aligned with a trailing boundary of the corresponding set of one or more symbols.

7. The method of claim 1, wherein:
the plurality of blocks within the single TTI are scheduled with a same grant; or
transmitting the plurality of blocks comprises transmitting at least two blocks via the same carrier during the single TTI such that the at least two blocks fill the single TTI, a leading boundary of the at least blocks is aligned with a leading boundary of the single TTI, and a trailing boundary of the at least two blocks is aligned with a trailing boundary of the single TTI.

8. The method of claim 1, wherein the plurality of blocks within the single TTI are configured with two or more grants and two or more modulation and coding schemes and convey two or more types of data.

9. A method of wireless communication, the method comprising:
receiving, by a receiver, a plurality of blocks corresponding to one or more transport blocks within a single transmission time interval (TTI), wherein each of the plurality of blocks spans over a pre-defined period of time that is shorter than the single TTI, wherein each of the plurality of blocks includes data corresponding to a same logical channel identifier and a same header, wherein each of the plurality of blocks is aligned with a trailing boundary of a corresponding set of one or symbols; and
decoding, by the receiver, a plurality of protocol data units in the plurality of blocks.

10. The method of claim 9, wherein the decoding includes decoding a portion of the plurality of protocol data units in two or more blocks of the plurality of blocks upon receiving the two or more blocks of the plurality of blocks.

11. The method of claim 10, wherein the plurality of protocol data units in the two or more blocks are not in sequence.

12. The method of claim 9, wherein receiving the plurality of blocks comprises receiving at least two blocks via the same carrier during the single TTI such that the at least two blocks fill the single TTI, a leading boundary of the at least two blocks is aligned with a leading boundary of the single TTI, and a trailing boundary of the at least two blocks is aligned with a trailing boundary of the single TTI.

13. The method of claim 9, wherein each of the plurality of blocks includes:
a transport block including control information and data; or
a transport block only including the data.

14. The method of claim 9, further comprising:
transmitting an acknowledgement message or a negative acknowledgement message for one or more of the plurality of blocks.

15. The method of claim 9, further comprising:
reordering the plurality of protocol data units in the plurality of blocks within the single TTI; and
delivering the plurality of protocol data units to an upper layer.

16. An apparatus configured for wireless communication, the apparatus comprising:
at least one processor; and
a memory coupled to the at least one processor,
wherein the at least one processor is configured:
to determine, by a transmitter, a plurality of blocks corresponding to one or more transport blocks within a single transmission time interval (TTI), wherein each of the plurality of blocks spans over a pre-defined period of time that is shorter than the single TTI, wherein each of the plurality of blocks includes data corresponds to a same logical channel identifier and a same header, wherein each of the plurality of blocks is aligned with a corresponding set of one or more symbols; and
to transmit, by the transmitter, the plurality of blocks within the single TTI.

17. The apparatus of claim 16,
wherein the at least one processor is further configured:
to pre-buffer two or more blocks of the plurality of blocks; and
to transmit the two or more blocks of the plurality of blocks upon the two or more blocks being pre-buffered; and
wherein a plurality of protocol data units in the two or more blocks are not in sequence.

18. The apparatus of claim 16, wherein:
the plurality of blocks comprise a first block corresponding to a first portion of a first transport block and a second block corresponding to a second portion of the first transport block; and
the first block and the second block are different sizes.

19. The apparatus of claim 16, wherein:
each set of one or more symbols comprises a code block; and
a leading boundary and a trailing boundary of each of the plurality of blocks are aligned with a leading boundary and a trailing boundary of the corresponding code block.

20. The apparatus of claim 16, wherein each of the plurality of blocks includes a transport block only including the data.

21. The apparatus of claim 16, wherein the at least one processor is further configured to retransmit one or more blocks of the plurality of blocks that are corrupted, and wherein a leading boundary and a trailing boundary of each of the plurality of blocks are aligned with a leading boundary and a trailing boundary of the corresponding set of one or more symbols.

22. The apparatus of claim 16, wherein:
the plurality of blocks comprise a first block corresponding to a first transport block and a second block corresponding to a second transport block;
the first block and the second block are different sizes;
a leading boundary and a trailing boundary of the first block are aligned with a leading boundary and a trailing boundary of a first symbol;
a leading boundary of the second block is aligned with a leading boundary of a second symbol; and
a trailing boundary of the second block is aligned with a trailing boundary of a third symbol.

23. The apparatus of claim 16, wherein the transmitter is further configured to transmit at least two blocks via the same carrier during the single TTI such that the at least two blocks fill the single TTI, a leading boundary of the at least two blocks is aligned with a leading boundary of the single TTI, and a trailing boundary of the at least two blocks is aligned with a trailing boundary of the single TTI.

24. An apparatus configured for wireless communication, the apparatus comprising:
- at least one processor; and
- a memory coupled to the at least one processor,
- wherein the at least one processor is configured:
  - to receive, by a receiver, a plurality of blocks corresponding to one or more transport blocks within a single transmission time interval (TTI), wherein each of the plurality of blocks spans over a pre-defined period of time that is shorter than the single TTI, wherein each of the plurality of blocks includes data corresponding to a same logical channel identifier and a same header, wherein each of the plurality of blocks is aligned with a corresponding set of one or more symbols; and
  - to decode, by the receiver, a plurality of protocol data units in the plurality of blocks.

25. The apparatus of claim 24, wherein the at least one processor is further configured to decode a portion of the plurality of protocol data units in two or more blocks of the plurality of blocks upon receiving the two or more blocks of the plurality of blocks.

26. The apparatus of claim 25, wherein a plurality of protocol data units in the two or more blocks are in sequence.

27. The apparatus of claim 24, wherein each of the plurality of blocks includes multiple protocol data units in sequence.

28. The apparatus of claim 24, wherein the plurality of blocks includes a transport block including control information and data and a transport block only including the data.

29. The apparatus of claim 24, wherein the receiver is further configured to receive at least two blocks via the same carrier during the single TTI such that the at least two blocks fill the single TTI, a leading boundary of the at least two blocks is aligned with a leading boundary of the single TTI, and a trailing boundary of the at least two blocks is aligned with a trailing boundary of the single TTI.

30. The apparatus of claim 24, further comprising configuration of the at least one processor:
- to reorder the plurality of protocol data units in the plurality of blocks within the single TTI; and
- to deliver the plurality of protocol data units to an upper layer.

* * * * *